UNITED STATES PATENT OFFICE.

PAUL SCHMIDT, OF ALTRAHLSTEDT, NEAR HAMBURG, GERMANY, ASSIGNOR TO THE FIRM: LANDWIRTSCHAFTLICHE HANDELSGESELLSCHAFT M. B. H., OF SUDSEE-HAUS, HAMBURG, GERMANY.

PROCESS OF PREPARING A FERTILIZER.

1,378,284.   Specification of Letters Patent.   Patented May 17, 1921.

No Drawing.   Application filed April 20, 1920. Serial No. 375,280½.

*To all whom it may concern:*

Be it known that I, PAUL SCHMIDT, a citizen of the German Republic, and residing at Altrahlstedt, near Hamburg, Germany, have invented certain new and useful Improvements in Processes of Preparing a Fertilizer Essentially Comprising Lime and Magnesia, of which the following is a specification.

This invention relates to an improved process of preparing a fertilizer essentially comprising lime and magnesium, in which the lime forms the carrier and distributer of the compounds of magnesium.

The high importance of lime for the vegetable growth is sufficiently known; in the first line, it considerably improves the physical qualities of the ground; secondly, it engenders the distribution of the fertilizing powers sleeping in the ground; and, thirdly, it furnishes an immediate fertilizing means for vegetable growth, particularly for herbacious plants and roots.

In comparison to the importance of the lime, but little attention, hitherto, has been given to the significance of compounds of magnesium in agriculture, and it has only recently been observed that this neglect of the high degrees of fertilizing elements contained in magnesium leads to a considerable diminution of the vegetable production, as a want of magnesium has been found to be an essential cause of a diminution not only of chlorophyl, but also of insufficient seed or grain.

It has further been stated by the experiments of scientific experts, that in agriculture a satisfactory production does not depend, in general, upon the presence of lime and of magnesium in the ground, but that such satisfactory results, on the contrary, require a distinct proportion of the quantity of lime to the quantity of magnesium, and also, that particular compounds of these two indispensable ingredients should be employed. Only if lime be employed in a favorable distinct proportion to magnesium and the compound be formed in a manner to be readily absorbed, the formation of the roots of the plant will be brought to such favorable results, which lead to a luxuriant growth of the roots, accompanied by a sufficient development of chlorophyl.

Hence, a rational employment of magnesium as a fertilizer for plants is of greatest importance not only in agriculture but equally in horticulture and production of seeds. In virtue of the afore-mentioned scientific statements, the process which forms the object of the present invention is this, to prepare a fertilizer for plants, in which, beside lime, as a fertilizing and generally improving means of the ground, magnesium is contained in such a form that, without being subject to be washed out by the rain, it allows of the widest distribution within the ground and offers the greatest possibility of being absorbed and utilized by the plant; the said form being this of magnesium hydroxid, precipitated and thereby distributed and combined with lime.

It should be mentioned that the use of salts of magnesium, by themselves, cannot the least be relied on, as it becomes easily washed out, for instance by rain, and, accordingly, does not obtain the desired effect. For fully realizing the purpose in view, the product should be prepared in the following manner:—

Caustic lime is mixed up with a solution of salts of magnesium. The latter may either be pure, freshly prepared solutions, for instance of chlorid or sulfate of magnesium, or they may be obtained from soluted waste products of chemical processes, or from solutions of natural oxids of magnesium; in using such solutions of either kind, absolute attention should be paid to previously eliminating any undue or disturbing substances.

The said mixing process resembles that of slaking lime, but should not be confounded with that process, as beside the formation of hydrate of lime the chemical processes or transformation between the lime and magnesium simultaneously occur. The said mixing process, accordingly, is conveniently operated by distributing the said solutions of salts of magnesia over the caustic lime which has been spread on convenient receptacles such as pans or the like, and causing the same to enter into intimate reaction with the lime. The proportions of the caustic lime and the salts of magnesium mixed to the same depend on the quality of the product to be obtained, that is whether the product is desired to contain more or less of the salts of magnesium, or if the product is desired to be of a pasty, a granular or a pulverized form. The solution of magnesium may also be applied in a heated or in a cold state or in a diluted or concentrated condition, according to the product to be obtained.

What I claim, is:—

The process of preparing a fertilizer containing magnesium hydroxid and lime which comprises treating lime with a pure solution of a salt of magnesium, and allowing the ingredients to react, substantially as and for the purpose set forth.

In testimony whereof I have hereunto set my hand in the presence of two subscribing witnesses.

PAUL SCHMIDT.

Witnesses:
NERM NELDSTRANDT,
BERNHARD SCHMIDT.